(12) United States Patent
Koyama et al.

(10) Patent No.: US 8,797,142 B2
(45) Date of Patent: Aug. 5, 2014

(54) DATA PROCESSING DEVICE, IC CARD AND COMMUNICATION SYSTEM

(75) Inventors: Jun Koyama, Kanagawa (JP); Kiyoshi Kato, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 590 days.

(21) Appl. No.: 12/754,416

(22) Filed: Apr. 5, 2010

(65) Prior Publication Data

US 2010/0253478 A1 Oct. 7, 2010

(30) Foreign Application Priority Data

Apr. 6, 2009 (JP) ................. 2009-092046

(51) Int. Cl.
*H04Q 5/22* (2006.01)
(52) U.S. Cl.
USPC ....... 340/10.1; 340/10.2; 340/10.3; 340/10.4; 340/10.41
(58) Field of Classification Search
USPC .............. 340/10.1, 10.2, 10.3, 10.4, 10.41
See application file for complete search history.

(56) References Cited

U.S. PATENT DOCUMENTS

| | | | |
|---|---|---|---|
| 5,490,117 A | 2/1996 | Oda et al. | |
| 5,585,949 A | 12/1996 | Yamazaki et al. | |
| 5,804,861 A | 9/1998 | Leach | |
| 6,046,676 A * | 4/2000 | Ward et al. | 340/572.1 |
| 6,346,886 B1 * | 2/2002 | De La Huerga | 340/573.1 |
| 6,479,883 B1 * | 11/2002 | Chen et al. | 257/546 |
| 6,720,866 B1 * | 4/2004 | Sorrells et al. | 340/10.4 |
| 7,061,014 B2 | 6/2006 | Hosono et al. | |
| 7,064,346 B2 | 6/2006 | Kawasaki et al. | |

(Continued)

FOREIGN PATENT DOCUMENTS

| | | |
|---|---|---|
| EP | 1 134 811 A1 | 9/2001 |
| EP | 1 850 378 A2 | 10/2007 |

(Continued)

OTHER PUBLICATIONS

Noboru Kimizuka et al.; "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System"; Journal of Solid State Chemistry; Apr. 1, 1995; pp. 170-178; vol. 116, No. 1.

(Continued)

*Primary Examiner* — Benjamin C Lee
*Assistant Examiner* — Quang D Pham
(74) *Attorney, Agent, or Firm* — Fish & Richardson P.C.

(57) ABSTRACT

An object is to provide a data processing device which achieves multiple functions or easy additional providing of a function while suppressing adverse influence on a communication distance or to improve resistance to electrostatic discharge in the data processing device. The data processing device includes an antenna which transmits and receives a first signal to/from a first terminal device through wireless communication, an integrated circuit which executes a process in accordance with the first signal, and a terminal portion which transmits and receives a second signal to/from a second terminal device and has an exposed conductive portion on its surface. A protection circuit is provided between at least one terminal of terminals of the terminal portion and a power supply terminal of a high potential and between the one terminal and a power supply terminal of a low potential.

13 Claims, 8 Drawing Sheets

(56) References Cited

U.S. PATENT DOCUMENTS

| | | | |
|---|---|---|---|
| 7,282,782 B2* | 10/2007 | Hoffman et al. | 257/613 |
| 7,323,356 B2 | 1/2008 | Hosono et al. | |
| 7,333,072 B2 | 2/2008 | Yamazaki et al. | |
| 7,644,349 B2* | 1/2010 | Schaffer | 714/819 |
| 7,858,972 B2 | 12/2010 | Tokunaga et al. | |
| 8,111,143 B2* | 2/2012 | Tong et al. | 340/10.51 |
| 8,203,142 B2 | 6/2012 | Tokunaga et al. | |
| 8,217,396 B2 | 7/2012 | Yamazaki et al. | |
| 2003/0199289 A1* | 10/2003 | Kao et al. | 455/575.1 |
| 2006/0017139 A1* | 1/2006 | Eguchi et al. | 257/656 |
| 2006/0219776 A1* | 10/2006 | Finn | 235/380 |
| 2006/0244107 A1 | 11/2006 | Sugihara et al. | |
| 2007/0004178 A1* | 1/2007 | Tsurume et al. | 438/460 |
| 2007/0022012 A1* | 1/2007 | Wu et al. | 705/20 |
| 2007/0045805 A1* | 3/2007 | Watanabe et al. | 257/686 |
| 2007/0127220 A1* | 6/2007 | Lippert et al. | 361/737 |
| 2007/0194379 A1 | 8/2007 | Hosono et al. | |
| 2008/0055046 A1* | 3/2008 | Shimizu | 340/10.1 |
| 2008/0061417 A1* | 3/2008 | Takeuchi | 257/679 |
| 2008/0062607 A1* | 3/2008 | Cheng et al. | 361/113 |
| 2008/0237805 A1* | 10/2008 | Ohnuma | 257/618 |
| 2009/0059453 A1* | 3/2009 | Arai et al. | 361/56 |
| 2009/0065588 A1* | 3/2009 | Aoki et al. | 235/492 |
| 2009/0079438 A1* | 3/2009 | Nurmi et al. | 324/538 |
| 2009/0102055 A1* | 4/2009 | Aoki et al. | 257/773 |
| 2009/0115041 A1* | 5/2009 | Igarashi | 257/679 |
| 2009/0147419 A1* | 6/2009 | Hung et al. | 361/56 |
| 2009/0149037 A1* | 6/2009 | Lee et al. | 439/37 |
| 2009/0159881 A1* | 6/2009 | Kando et al. | 257/48 |
| 2009/0159998 A1* | 6/2009 | Tsurume et al. | 257/428 |
| 2009/0189738 A1* | 7/2009 | Hermle | 340/10.1 |
| 2009/0323234 A1* | 12/2009 | Bach | 361/56 |
| 2010/0026461 A1* | 2/2010 | Merchan et al. | 340/10.1 |
| 2010/0032486 A1* | 2/2010 | Tasaki et al. | 235/492 |
| 2010/0033307 A1* | 2/2010 | Narendra et al. | 340/10.1 |
| 2010/0163631 A1* | 7/2010 | Ishii et al. | 235/492 |
| 2010/0171117 A1* | 7/2010 | Kuwabara et al. | 257/43 |
| 2010/0238032 A1* | 9/2010 | Greene | 340/572.1 |
| 2011/0133282 A1* | 6/2011 | Okushima | 257/358 |
| 2012/0248470 A1 | 10/2012 | Yamazaki et al. | |
| 2013/0001571 A1 | 1/2013 | Yamazaki et al. | |

FOREIGN PATENT DOCUMENTS

| | | |
|---|---|---|
| JP | 05-251705 A | 9/1993 |
| JP | 06-333103 A | 12/1994 |
| JP | 08-030747 A | 2/1996 |
| JP | 2751082 B2 | 5/1998 |
| JP | 2000-044236 A | 2/2000 |
| JP | 2000-150900 A | 5/2000 |
| JP | 2000-353227 A | 12/2000 |
| JP | 2001-216490 | 8/2001 |
| JP | 2001-216490 A | 8/2001 |
| JP | 2002-076356 A | 3/2002 |
| JP | 2002-289859 A | 10/2002 |
| JP | 2003-346108 A | 12/2003 |
| JP | 2004-310069 A | 11/2004 |
| JP | 2005-033172 A | 2/2005 |
| JP | 2006-065320 A | 3/2006 |
| JP | 2006-153470 A | 6/2006 |
| JP | 2007-318104 A | 12/2007 |
| WO | 03/040441 A1 | 5/2003 |

OTHER PUBLICATIONS

Kenji Nomura et al.; "Room-temperature fabrication of transparent flexible thin-film transistors using amorphous oxide semiconductors"; Nature; Nov. 25, 2004; pp. 488-492; vol. 432.

Kenji Nomura et al.; "Thin-Film Transistor Fabricated in Single-Crystalline Transparent Oxide Semiconductor"; Science; May 23, 2003; pp. 1269-1272; vol. 300, No. 5623.

Chunfei Li et al.; "Modulated Structures of Homologous Compounds InMO3(ZnO)m (M=In,Ga; m=Integer) Described by Four-Dimensional Superspace Group"; Journal of Solid State Chemistry, 1998, pp. 347-355; vol. 139.

Toshio Kamiya et al.; "1a-F-5 Room temperature fabrication and carrier transport of amorphous semiconductor exhibiting large electron Hall mobilities > 10 cm2/Vs"; (The 65th Autumn Meeting, 2004) The Japan Society of Applied Physics; Sep. 1, 2004; No. 2, p. 791.

Kenji Nomura; "Carrier transport in transparent oxide semiconductor with intrinsic structural randomness probed using single-crystalline InGaO3(ZnO)5 films"; Appl. Phys. Lett. (Applied Physics Letters); Sep. 13, 2004; pp. 1993-1995; vol. 85, No. 11.

Kenji Nomura et al.; "31a-ZA-6 Carrier Transport in Transparent Amorphous Oxide Semiconductor InGaZnO4"; (The 51st Spring Meeting, 2004); The Japan Society of Applied Physics and Related Societies; Mar. 28, 2004; p. 669; No. 2.

* cited by examiner

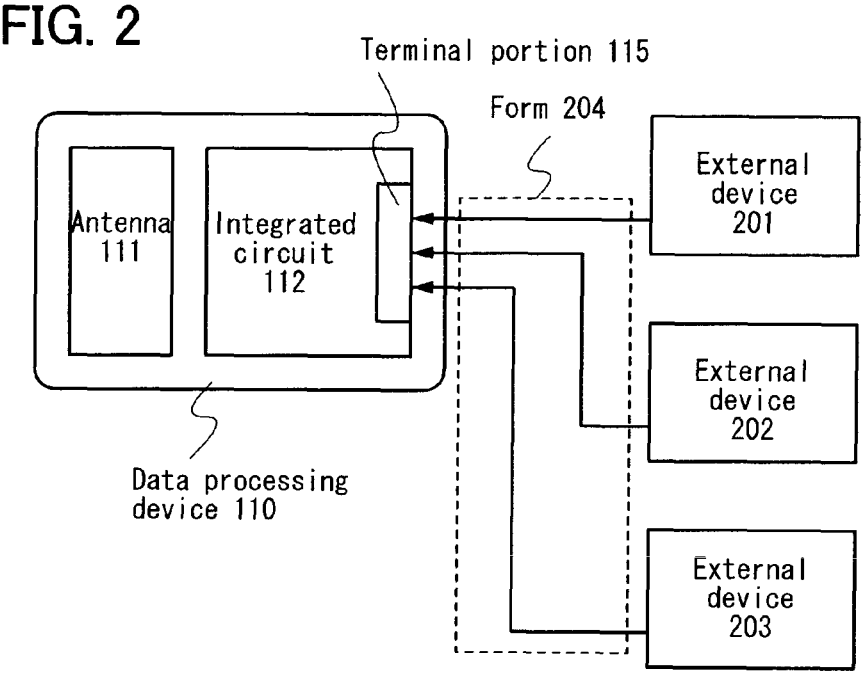

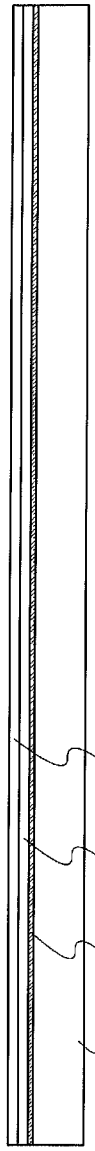
FIG. 4A
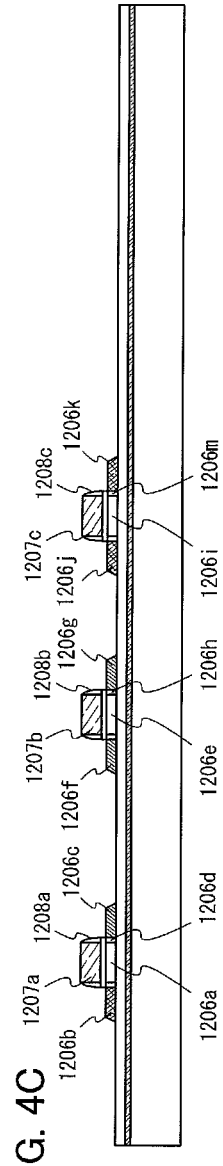
FIG. 4B
FIG. 4C

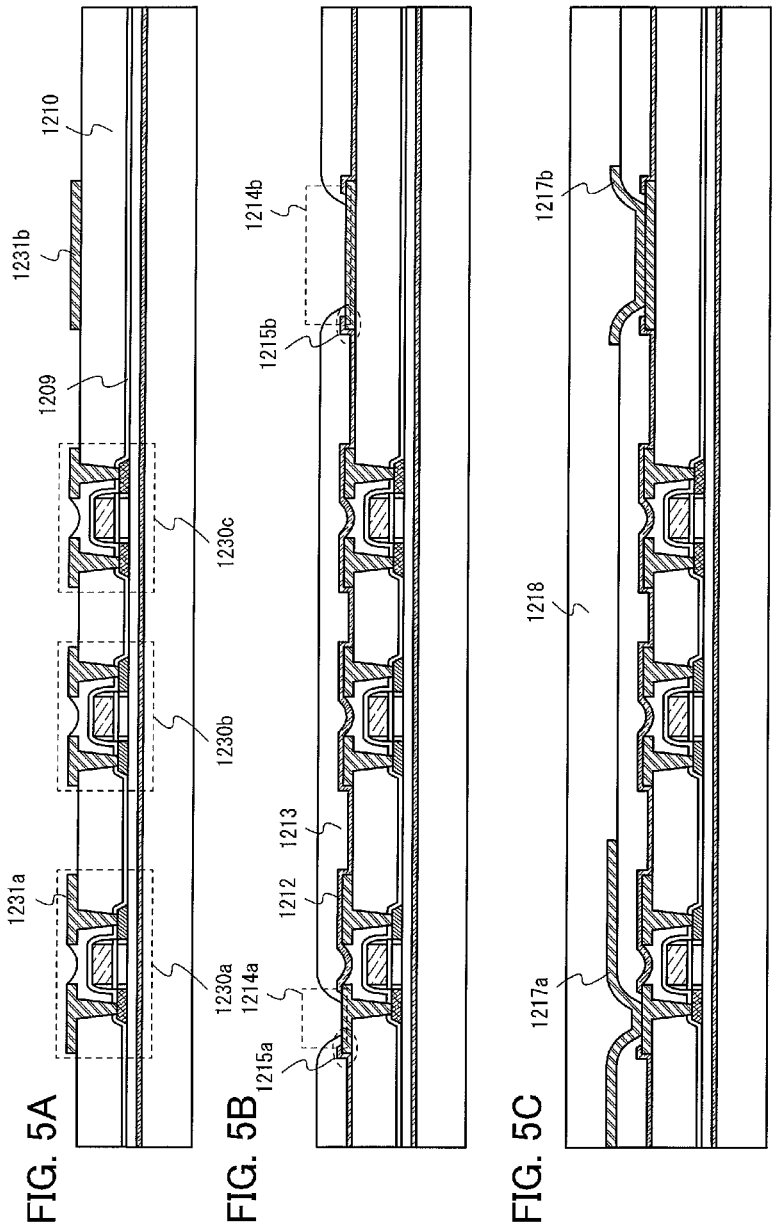

DATA PROCESSING DEVICE, IC CARD AND COMMUNICATION SYSTEM

BACKGROUND OF THE INVENTION

1. Field of the Invention

This specification relates to a data processing device for transmission and reception of data to/from a terminal device through wireless communication and communication system using the data processing device.

2. Description of the Related Art

In recent years, an environment where information network can be accessed at any time in any situations, which is referred to as a ubiquitous information society, has been facilitated. In such an environment, an individual identification technique has attracted attentions, such that an identification number (ID) is assigned to each object, whereby the history of the object is clarified and the production, management, or the like is facilitated. Above all, non-contact data processing devices capable of wirelessly transmitting and receiving data have started to be used.

Individual object identification techniques which utilize an RFID (radio frequency identification) tag as a non-contact data processing device that is capable of wireless transmission, reception, storing, erasing, or the like of data have attracted attention. The RFID tag is also referred to as an RF tag, a wireless tag, an electronic tag, or a wireless chip. Alternatively, since an integrated circuit (IC) for executing authentication or other processing is provided in the tag, it is also referred to as an IC tag, an IC chip, or an IC card. For transmission and reception of data to/from the non-contact data processing device, a reading/writing terminal device (hereinafter referred to as a reader/writer) is used. The individual object identification techniques have started facilitating production, management, or the like of each object and are expected to be applied to individual authentication.

As the non-contact data processing device which transmits and receive data, in addition to the non-contact data processing device described above, a non-contact data processing device which performs communication through contact between a terminal provided on the surface of a card and a terminal on the reader/writer side has been known. Further, an IC card which is provided with both an antenna and a terminal to have both functions of contact communication and non-contact communication has been known (e.g., Patent Document 1).

Furthermore, not only a function of individual object authentication but also a function of advanced processing function can be added to the IC card and a variety of processing can be executed in the IC card. Such an IC card in which an arithmetic circuit (e.g., a CPU) is provided has also been known (e.g., Patent Document 2).

REFERENCE

Patent Document

[Patent Document 1] Japanese Published Patent Application No. 2001-216490

[Patent Document 2] Japanese Patent No. 2751082

SUMMARY OF THE INVENTION

In the case of a data processing device having a contact-type terminal, since a large area of a conductive portion is exposed on a surface, a problem of an electrostatic breakdown of an internal circuit due to electrostatic discharge (ESD) (hereinafter, an electrostatic breakdown due to ESD is simply referred to as ESD in some cases) easily occurs.

In addition, in a non-contact data processing device which achieves multiple functions by providing of a CPU inside, dedicated design is required for a CPU portion of each function to be provided. Moreover, the more functions the non-contact data processing device has, the larger a circuit scale inside becomes; therefore, increase in power consumption easily becomes a problem. Specifically, among non-contact data processing devices that perform wireless communication without contact, a non-contact data processing device called a passive type which internally generates driving power from an alternating current signal used for transmission and reception consumes a large amount of power in an internal circuit, which greatly influences a communication distance.

In view of the above problems, it is an object to provide a data processing device which achieves multiple functions or easy additional providing of a function while suppressing adverse effect on a communication distance. Alternatively, it is another object to increase a resistance to electrostatic discharge in the data processing device.

A data processing device of the present invention includes an antenna which transmits and receives a first signal to/from a first terminal device through wireless communication; an integrated circuit which executes a process in accordance with the first signal; and a terminal portion which transmits and receives a second signal to/from a second terminal device and has an exposed conductive portion on its surface. The first signal has a carrier wave and a modulated wave generated by modulating an amplitude or a frequency of the carrier wave in accordance with data. The second signal is a digital signal. A protection circuit is provided between at least one terminal of terminals of the terminal portion and a power supply terminal of a high potential and between the one terminal and a power supply terminal of a low potential.

(Claim 2)

The integrated circuit includes a thin film transistor formed over an insulating surface. The protection circuit has a structure in which at least one diode selected from a PN diode, a PIN diode, a Schottky barrier diode, and a thin film transistor which is diode-connected by short-circuit between a gate and a drain of the thin film transistor which are formed over the insulating surface is provided between the terminal and the power supply terminal of the high potential and between the terminal and the power supply terminal of the low potential so as to be reverse biased in a normal state. The thin film transistor and the diode included in the protection circuit may each have a semiconductor film formed in the same step.

(Claim 3)

A p-type impurity region or an n-type impurity region included in the PN diode or the PIN diode may be formed in a step in which an impurity region of the thin film transistor is formed and the p-type impurity region or the n-type impurity region may be formed in the semiconductor film. In addition, the p-type impurity region or the n-type impurity region may be formed in the same plane surface.

(Claim 4)

An IC card including the data processing device and a base material supporting the data processing device is provided. The base material has a structure body for supporting and fixing the second terminal device when the second terminal device is connected in the terminal portion.

(Claim 5)

A communication system which uses the data processing device or the IC card, the first terminal device, and the second terminal device.

According to the above-described means, a required function is provided by an external integrated circuit and the external integrated circuit is connected to a data processing device through a terminal portion thereof; therefore, the data processing device that achieves easy additional providing or easy replacement of a function can be provided. The terminal portion can have an adequate resistance to ESD by formation of a protection circuit inside the data processing device. Further, since integrated circuits with different functions can be formed and connected to the data processing device, an integrated circuit with a large scale does not need to be formed inside the data processing device in advance. Therefore, the data processing device can reduce power consumption and contribute to increase in a communication distance.

BRIEF DESCRIPTION OF THE DRAWINGS

FIG. 2 is a diagram illustrating a connection mode of a data processing device and an external device.

FIGS. 4A to 4C are diagrams illustrating manufacturing steps of a data processing device.

FIGS. 5A to 5C are diagrams illustrating manufacturing steps of a data processing device.

DETAILED DESCRIPTION OF THE INVENTION

Figure 1A:
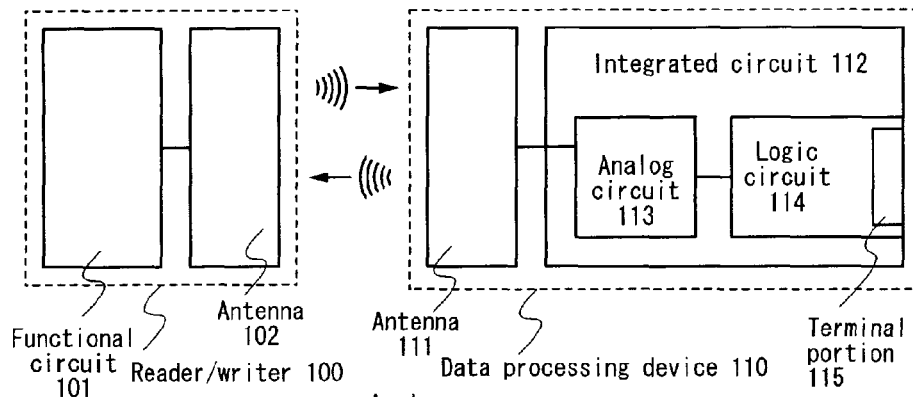
FIGS. 1A to 1C are diagrams illustrating one embodiment of a data processing device.

Hereinafter, embodiments of the present invention will be described in detail with reference to the accompanying drawings. Note that in the structures of the embodiments shown below, like portions or portions having a similar function are denoted by like reference numerals in different drawings, and the description thereof is omitted in some cases.

Embodiment 1

A structure of a data processing device in this embodiment is described.

FIG. 1A illustrates wireless communication between the data processing device and a reader/writer in this embodiment. A reader/writer 100 includes an antenna 102 for transmitting and receiving carrier waves or modulation waves through wireless communication, a functional circuit 101 for each processing in accordance with data extracted from the modulation waves, and the like. A data processing device 110 includes an antenna 111 and an integrated circuit 112 including functional circuits. The integrated circuit 112 includes an analog circuit 113 which performs generation of electric power, demodulation or modulation of a signal, or the like and a logic circuit 114 which mainly has a logic function. The logic circuit 114 includes a terminal portion 115 as described later.

Carrier waves are signals of alternating current waves which are also referred to as carriers. In wireless communication, the frequency or amplitude of the carrier wave is changed (modulated) in accordance with a signal representing data to generate a modulated wave, and a signal is transmitted and received through transmission and reception of the modulated wave. A modulation method in which a signal is generated by increasing and decreasing the amplitude of a carrier wave by modulation is called amplitude modulation. A modulation method in which a signal is generated by increasing and decreasing the frequency of a carrier wave by modulation is called frequency modulation.

Figure 1B:
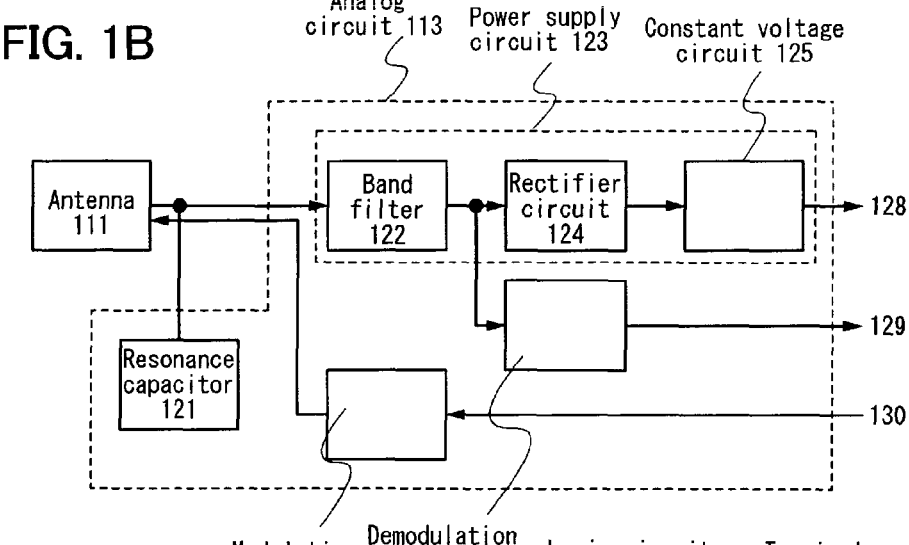

FIG. 1B illustrates the analog circuit 113 and a peripheral structure thereof. When the antenna 111 receives a carrier wave or a modulated wave, the carrier wave or the modulated wave is input to a power supply circuit 123 and electric power is generated from an alternating current signal and is output (see 128). In a data processing device called a passive type, electric power generated at that time is used as driving power of the integrated circuit in the data processing device. In the power supply circuit 123, a rectifier circuit 124 generates direct current electric power from the alternating current signal and a constant voltage circuit 125 keeps an output potential almost constant. The constant voltage circuit 125 is provided in order to stabilize internal circuit operation by outputting almost constant potential regardless of the intensity of a received signal which changes depending on a communication state of the antenna 111. In addition, a band filter 122 is provided in order to remove noise mixed in the carrier wave or the modulated wave received at the antenna 111.

On the other hand, the modulated wave includes a signal from the reader/writer 100 and the signal is extracted by a demodulation circuit 126. The extracted signal is sent to the logic circuit 114 as a digital signal (see 129) and a required process is executed. In addition, when a response signal is generated in the logic circuit 114, the response signal is sent to the modulation circuit 127 (see 130) and the data processing device 110 responds by modulation of a carrier wave received by the antenna 111 at that time in accordance with the signal.

Figure 1C:
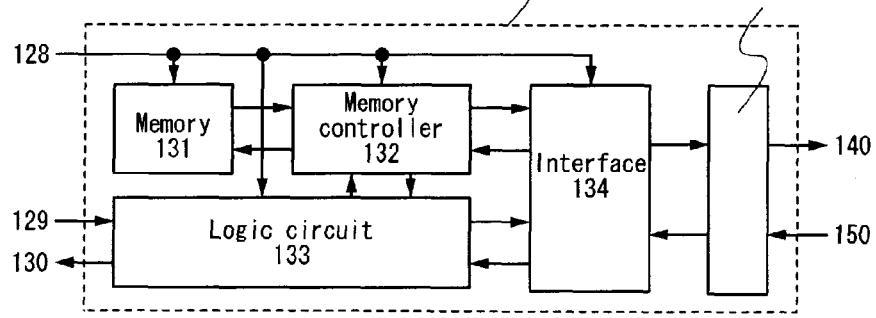

FIG. 1C illustrates the logic circuit 114 and a peripheral structure thereof. The logic circuit 114 includes a memory 131 in which data unique to the data processing device or data required for authentication, or the like is stored, a memory controller 132 which manages access, including operation of reading/writing data from/to the memory, a logic circuit 133 for receiving a demodulated signal (see 129) and outputting a response signal to the modulation circuit (see 130) after a required process is executed, and an interface 134. These circuits are driven with the use of electric power generated by the power supply circuit 123 as power supply.

One feature of the data processing device in this embodiment is to include the interface 134 and the terminal portion 115. The terminal portion 115 includes a conductive terminal on a surface of the data processing device and transmits and receives a signal by direct connection with an external device. In that case, unlike the signal in the case of the above-described wireless communication, the transmitted and received signal is directly input or output through the terminal as a digital signal represented by rectangular waves or an analog signal represented by a potential at that time without conversion such as demodulation or modulation. Data stored in the memory 131 or a signal output from the logic circuit 133 is extracted to the terminal portion 115 through the interface 134 and sent to the external device (see 140). Alternatively, a signal can be input to the data processing device from a connected external device through the interface 134 (see 150).

The interface 134 has a function of converting a signal output from the logic circuit 133 in accordance with an external device so that the external device connected through the terminal portion can deal with the signal; or a function of converting the form of a signal input from a different external device to a form which the logic circuit 133 can deal with.

Figure 3A:
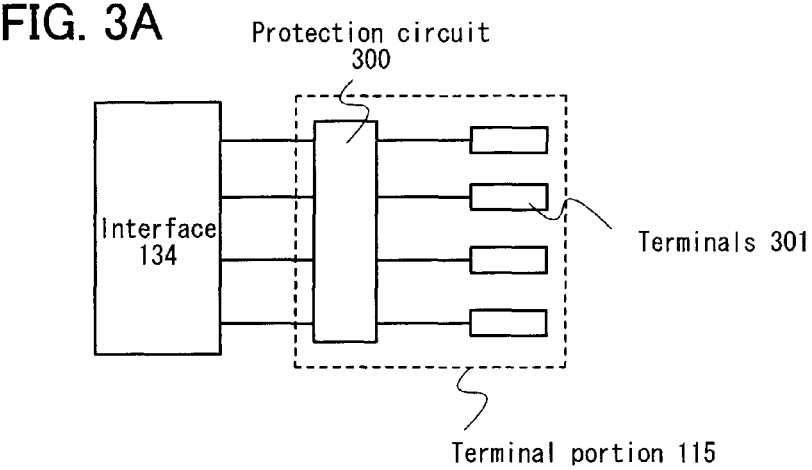
FIGS. 3A and 3B are diagrams illustrating a structural example of a terminal portion in a data processing device.

FIG. 3A illustrates the terminal portion 115 in detail. Signal lines are lead from the interface 134 and terminals 301 are provided as portions where the interface 134 is connected to an external device. Since the number of terminals 301 differs depending on an external device expected to be connected to the terminals 301, it is not specified here. Conductors are exposed at surfaces of the terminals 301; therefore, ESD easily occurs. Thus, a protection circuit 300 is preferably provided for the terminals 301.

Figure 3B:
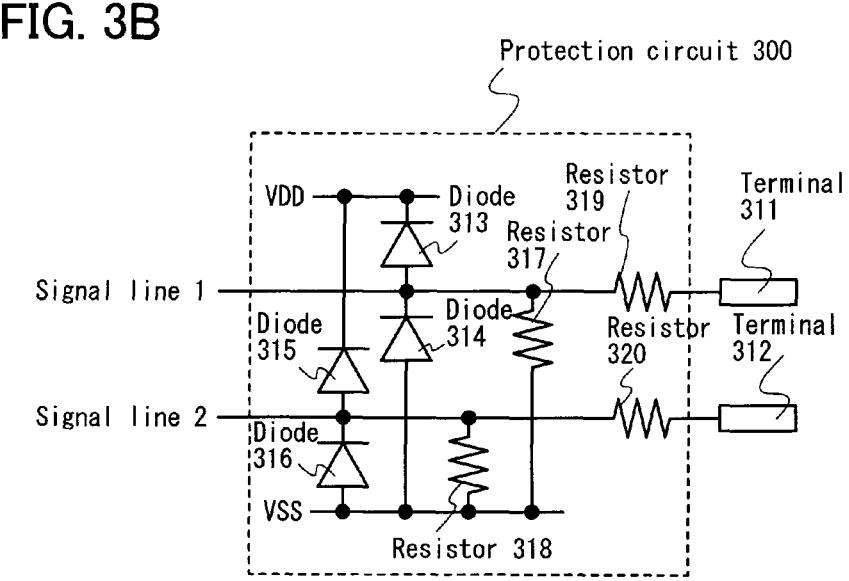

FIG. 3B illustrates an example of a structure of the protection circuit 300 provided for the terminals 301. As a function required for the protection circuit, the following can be given: as a first function, suppressing entry of electric charges which are charged in the terminal portion to an internal element because of ESD; as a second function, quickly releasing the charges to a different node (mainly to a power supply node) in order to prevent a breakdown of an element caused by a potential difference with the different node, which is made when the entered charges remain; as a third function, keeping the potentials of the respective terminals the same as much as possible in the case where the terminals are not connected to any external device; or the like.

A resistor 319 which is inserted in a path connected to a terminal 311 from a signal line 1 and a resister 320 which is inserted in a path connected to a terminal 312 from a signal line 2 are provided in order to achieve mainly the first function.

A diode 313 inserted between the signal line 1 and a VDD terminal, a diode 315 inserted between the signal line 2 and the VDD terminal, a diode 314 inserted between the signal line 1 and a VSS terminal, and a diode 316 inserted between the second signal line 2 and the VSS terminal are provided in order to achieve mainly the second function. It is preferred that signals normally input or output to/from the signal line 1 and the signal line 2 are not interrupted by providing the diodes 313 to 316 so that a voltage between the signal line 1 and the VDD terminal, a voltage between the signal line 1 and the VSS terminal, a voltage between the signal line 2 and the VDD terminal, and/or a voltage between the signal line 2 and the VSS terminal is applied to the diodes 313 to 316 in reverse bias direction in a normal state. In the case of the structure shown in FIG. 3B, the signals normally input or output to/from the signal line 1 and the signal line 2 have an amplitude lower than or equal to (VDD–VSS). At that time, the diodes 313 to 316 are reverse biased regardless of the state of the signal. On the other hand, when the potential of the signal line 1 or the signal line 2 becomes excessively high (higher than VDD) because of charging of the signal line 1 or the signal line 2 by ESD, the diode 313 or 315 is forward biased and promptly release positive charges to the VDD terminal side. Alternatively, when the potential of the signal line 1 or the signal line 2 becomes excessively low (lower than VSS), the diode 314 or 316 is forward biased and promptly release negative charges to the VSS terminal side. Through this operation, a breakdown of an internal element due to the abnormal values of the potentials of the signal line 1 and the signal line 2 can be prevented.

Note that although there is no particular limitation on the form, structure, or the like of the diodes 313 to 316, a manufacturing process, the range of power supply voltage for using a device, or the like should be taken into consideration. For example, a PN diode, a PIN diode, a Schottky barrier diode, a transistor whose gate and drain are short-circuited and is diode-connected, or the like can be used. As junction, the following can be given: PN junction or PIN junction in the vertical direction using a p-type semiconductor and an n-type semiconductor; PN junction or PIN junction in the vertical direction using a semiconductor and a metal in a stacked thin films; or PN junction or PIN junction in the horizontal direction using a region imparting a p-type conductivity and a region imparting an n-type conductivity which are arranged in the horizontal direction in a semiconductor film or formed in contact with each other.

As such a diode, when a device is formed using a thin film transistor (TFT) as an active element, for example, a diode which can be formed simultaneously with the TFT by utilizing a manufacturing process thereof is preferably used. Specifically, a PIN diode which has junction in the horizontal direction, or the like is in consistency with the manufacturing process of the TFT, which is preferable.

A resistor 317 inserted between the signal line 1 and the VDD terminal and a resistor 318 inserted between the signal line 2 and the VDD terminal are provided in order to achieve mainly the third function. In the case where the terminal is not connected to any external device, each of the terminal 311 and the terminal 312 is in a floating state and potential thereof is not determined. Since the potential of such a node easily varies due to disturbance such as ESD, the node is preferably connected to another terminal (a power supply terminal which has a fixed potential, or the like is often employed) through a resistor so that a potential difference is not made. In FIG. 3B, the potential of the signal line 1 and the potential of the signal line 2 are pulled down by connecting the signal line 1 and the signal line 2 to the VSS terminal side through the resistor 317 and the resistor 318. Depending on an internal circuit configuration or the like, the potential of the signal line 1 and the potential of the signal line 2 may be pulled up by connecting the signal line 1 and the signal line 2 to the VDD terminal side.

Note that since the resistors 319 and 320 are inserted in input/output paths of signals in series, the resistances of the resistors 319 and the resistor 320 are preferably set to values which do not interrupt input/output of actual signals; approximate several kiloohms to several hundreds of kiloohms is preferable. As described above, the resistors 317 and 318 are used as pull-down resistors or pull-up resistors. However, the resistors 317 and 318 are physically used for short-circuit between a signal line and another terminal; therefore, the resistors 317 and 318 preferably have high resistance to the extent that leak current does not adversely influence operation. As a numeral value, several megaohms to several tens of megaohms is preferable. Note that the resistance values of the resistors 317 and 318 are not limited to the range of the numeral values above as long as the resistors 317 and 318 satisfy the above-described function.

Alternatively, although not specifically illustrated in FIG. 3B, in the case where the VDD terminal and the VSS terminal which are power supply terminals are provided outside like the terminals 311 and 312, a diode can be inserted between the VDD terminal and the VSS terminal. For example, it is preferable that a diode be inserted between the VDD terminal and the VSS terminal so as to be reverse biased so that the diode is used as a current path in the case where the VSS terminal side is positively charged or the VDD terminal is negatively charged. Although a diode may be inserted between the VDD terminal and the VSS terminal so as to be forward biased, since forward bias corresponding to a driving power supply voltage is applied between the VDD terminal and the VSS terminal in normal operation, a plurality of stages of diodes is preferably inserted and connected in series in order to prevent current from flowing to the diode in that state.

Embodiment 2

FIG. 2 illustrates a mode of connection between a data processing device in this embodiment and external devices. By connecting the data processing device 110 to an external device A201, an external device B202, or an external device C203 through the terminal portion 115 provided for the data processing device 110, a function of each of the external devices can be provided for the data processing device 110.

For example, in the case where the functions of the external devices A201 to C203 are different from each other and a usage environment differs in each of the functions, when a plurality of functions provided by the above described external device group is provided for the integrated circuit 112 in advance, a circuit scale naturally increases. Therefore, since the number of elements increases, increase in power consumption is inevitable. Although reduction in power consumption to some extent is possible by, for example, selectively supplying electric power to only some circuits in accordance with a function to be used so that constant supply of electric power to a circuit which is not used is prevented, a circuit needs to be further provided to increase functions.

According to this embodiment, since a group of the external devices each having a different function can be physically connected or disconnected, overall, power consumption can be reduced in use of each function while multiple functions are achieved.

In addition, by standardizing a form 204 in which the data processing device 110 deals with each of the external devices A201 to C203 to some extent in advance, the degree of freedom of developing the external device can be increased. The interface 134 described with reference to FIGS. 1A to 1C may have a function of controlling this form.

On the other hand, the data processing device 110 can perform not only contact communication with the external device through the terminal portion 115 but also wireless communication with a reader/writer through the antenna 111. When the interface 134 of the data processing device 110 is formed so as to conform to a standard employed by general devices (e.g., a standard of connection of devices or data communication), the interface 134 can also be used as an interface conversion device for providing a wireless communication interface for the external devices A201 to C203.

A variety of modes of the scale of the integrated circuit 112 can be given. For example, functions may be provided to the extent allowed by power consumption or, provided with a strict limitation, for example, only identification function with a certain device may be provided and other functions may be provided by connection with the external device. In this manner, depending on a function provided for an IC card in advance, the scale of the integrated circuit 112 greatly changes. However, as long as the integrated circuit 112 has at least a function of processing a signal transmitted and received through the antenna 111 and processing a signal transmitted and received through the terminal portion 115, there is no limitation on an additional function here.

In addition, the external devices A201 to C203 may be driven with electric power generated inside the data processing device 110 by being connected to and mounted on the data processing device 110. Alternatively, the external devices A201 to C203 themselves may have a power supply. In the latter case, the integrated circuit 112 inside the data processing device may be driven with supply of electric power from the power supply included in the external devices.

Embodiment 3

Figure 8:
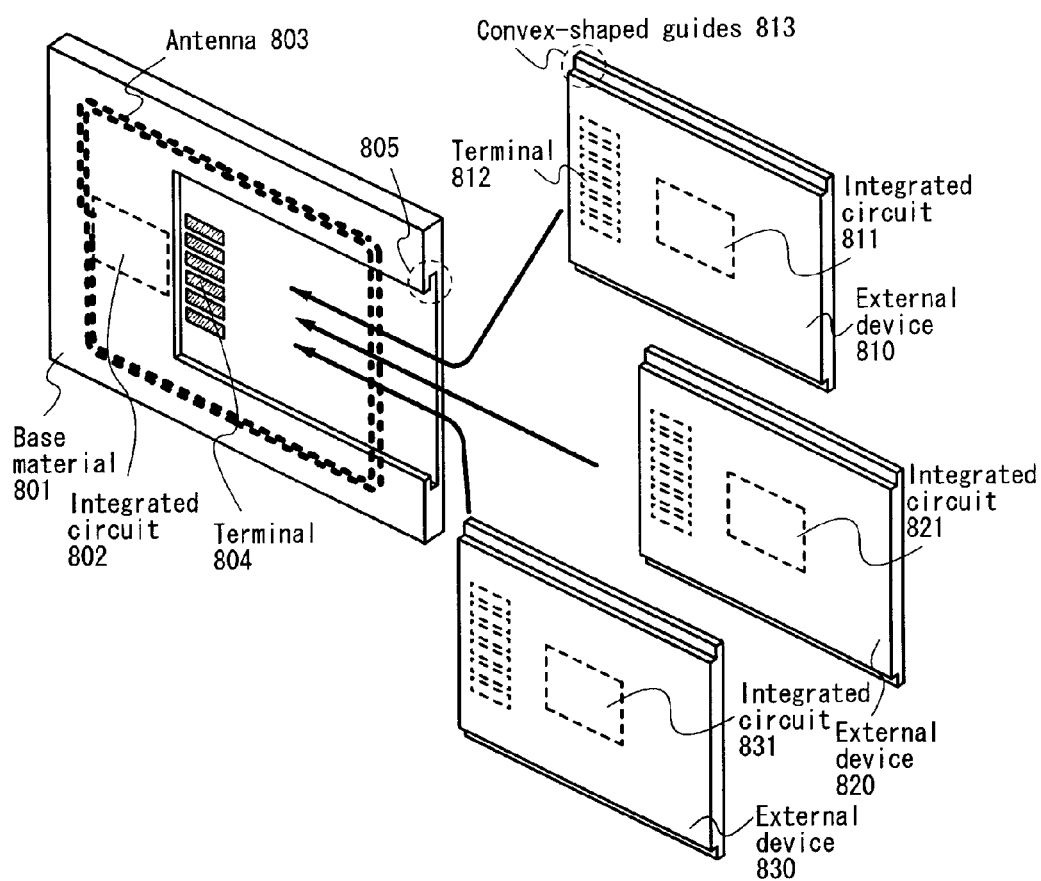
FIG. 8 is a diagram illustrating a connection mode of a data processing device and an external device.

A data processing device in FIG. 8 has a card shape by incorporating a data processing device including an antenna 803, an integrated circuit 802, and a terminal 804 in a base material 801 for supporting them. A data processing device having such a mode is referred to as an IC card or the like. The base material 801 is formed using a resin material or the like and integrated circuit 802 and the antenna 803 are embedded inside the base material 801 to be supported. In that case, the data processing device may have a supporting and fixing structure as shown by the reference numeral 805 for supporting and fixing external devices 810, 820, and 830 so as to avoid disconnection. In the case of FIG. 8, concave-shaped guides 805 are provided on the base material 801 (IC card) side and convex-shaped guides 813 are provided on the external device 810 side. The terminal 804 and the terminal 812 are connected to each other by sliding the external device into the base material 801 and engaging the guides 805 and the guides 813. The external devices include respective integrated circuits 811, 821, and 831 and additional providing of a function is achieved by connecting the external device to the base material 801 (IC card).

In contrast, a structure, a tab, a bracket, or the like may be provided on the external device side in order to support and fix the IC card. Specifically, as described in Embodiment 2, in the case where an IC card is used as an interface conversion device for providing a wireless communication interface function to an external device with a large circuit scale, a usage mode in which the external device is used as a main body and the IC card is inserted therein is possible.

Moreover, although this embodiment shows an example in which the supporting and fixing structure is formed using the base material included in the IC card or the external device, this embodiment is not limited to this example. A supporting component may be formed by another component and mounted.

Embodiment 4

In this embodiment, a method for manufacturing the data processing device described in the above embodiments is described with reference to FIGS. 4A to 4C, FIGS. 5A to 5C, and FIG. 6.

First, a separation layer 1202 is formed on a surface of a substrate 1201, and then an insulating film 1203 serving as a base and a semiconductor film 1204 (for example, a film containing amorphous silicon) are formed (see FIG. 4A). The separation layer 1202, the insulating film 1203, and the semiconductor film 1204 can be formed successively. By forming successively, they are not exposed to the air, so that impurities can be prevented from being contained therein.

A glass substrate, a quartz substrate, a metal substrate, a stainless steel substrate, a plastic substrate having heat resistance high enough to withstand processing temperatures of a process in this embodiment, or the like may be used as the substrate 1201. Such a substrate has no significant limitation on its area or its shape. Thus, in a case of using a substrate which is a rectangular shape having a side length of 1 meter or longer for example, productivity can be significantly increased. Such an advantage is highly favorable as compared with the case where a circular silicon substrate is used. Therefore, even when a circuit portion occupies a larger area, production cost can be reduced as compared to the case of using the silicon substrate.

Note that, in this process, the separation layer 1202 is provided on an entire surface of the substrate 1201; however, after providing the separation layer on the entire surface of the substrate 1201, the separation layer 1202 may be selectively provided by photolithography, if necessary. In addition, the separation layer 1202 is formed so as to be in contact with the substrate 1201; however, an insulating film such as a silicon oxide film, a silicon oxynitride film, a silicon nitride film, or a silicon nitride oxide film, may be formed so as to be in contact with the substrate 1201 as needed, and the separation layer 1202 may be formed so as to be in contact with the insulating film.

Here, oxynitride refers to a substance that contains more oxygen than nitrogen, and nitride oxide refers to a substance that contains more nitrogen than oxygen. For example, silicon oxynitride is a substance including oxygen, nitrogen, silicon, and hydrogen in ranges of 50 at. % to 70 at. % inclusive, 0.5 at. % to 15 at. % inclusive, 25 at. % to 35 at. % inclusive, and 0.1 at. % to 10 at. % inclusive, respectively. Further, silicon nitride oxide is a substance including oxygen, nitrogen, silicon, and hydrogen in ranges of 5 at. % to 30 at. % inclusive, 20 at. % to 55 at. % inclusive, 25 at. % to 35 at. % inclusive, and 10 at. % to 30 at. % inclusive, respectively. Note that the above-described ranges are obtained by measurement using Rutherford backscattering spectrometry (RBS) or hydrogen forward scattering (HFS). In addition, the total of the percentages of the constituent elements does not exceed 100 at. %.

As the separation layer 1202, a metal film, a layered structure of a metal film and a metal oxide film, or the like can be used. The metal film has a layered structure or a multi-layer structure of a film made of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), an alloy containing such an element as its main component, or a compound containing such an element as its main component. The film can be formed by a sputtering method, various CVD methods such as a plasma CVD method or the like, using these materials. A layered structure of a metal film and a metal oxide film can be obtained by, after forming the above-described metal film, applying plasma treatment thereto under an oxygen atmosphere or an $N_2O$ atmosphere or applying heat treatment thereto under an oxygen atmosphere or an $N_2O$ atmosphere; whereby oxide or oxynitride of the metal film can be formed on the surface of the metal film. Alternatively, after the metal film is formed, the surface of the metal film may be subjected to treatment with a highly oxidizing solution such as ozone water, whereby oxide or oxynitride of the metal film can be provided on the surface of the metal film.

As the insulating film 1203, a single layer or a stacked layer of a film containing oxide of silicon or nitride of silicon is formed by a sputtering method, a plasma CVD method, or the like. In the case where the base insulating film employs a two-layer structure, a silicon nitride oxide film may be formed as a first layer, and a silicon oxynitride film may be formed as a second layer, for example. In the case where the base insulating film employs a three-layer structure, a silicon oxide film, a silicon nitride oxide film, and a silicon oxynitride film may be formed as a first insulating film, a second insulating film, and a third insulating film, respectively. Alternatively, a silicon oxynitride film, a silicon nitride oxide film, and a silicon oxynitride film may be formed as a first insulating film, a second insulating film, and a third insulating film, respectively. The insulating film 1203 serving as a base serves as a blocking film for preventing the entry of impurities from the substrate 1201.

The semiconductor film 1204 can be formed by a sputtering method, an LPCVD method, a plasma CVD method, or the like, to have a thickness about from 25 nm to 200 nm, inclusive. The thickness is preferably about from 50 nm to 70 nm, inclusive, specifically, 66 nm. An amorphous silicon film may be formed as the semiconductor film 1204.

Next, the semiconductor film 1204 is irradiated with laser light to be crystallized. Note that the semiconductor film 1204 may be crystallized by combining laser light irradiation and thermal crystallization using RTA or an annealing furnace, thermal crystallization using a metal element that promotes crystallization, or the like. Then, the obtained crystalline semiconductor film is etched into a desired shape to form a semiconductor film 1204a, a semiconductor film 1204b, and a semiconductor film 1204c. A gate insulating film 1205 is formed so as to cover the semiconductor films 1204a to 1204c (see FIG. 4B).

An example of a step for manufacturing the semiconductor films 1204a to 1204c is briefly described hereinafter. First, an amorphous semiconductor film (e.g., an amorphous silicon film) is formed by a plasma CVD method. Next, a solution containing nickel that is a metal element for promoting crystallization is retained on the amorphous semiconductor film, and a dehydrogenation treatment (at 500° C., for one hour) and a thermal crystallization treatment (at 550° C., for four hours) are performed on the amorphous semiconductor film, thereby a crystalline semiconductor film is formed. Then, when necessary, the crystalline semiconductor film is irradiated with laser light from a laser depending on the degree of crystallinity, and the semiconductor films 1204a to 1204c are formed by a photolithography method. Note that the amorphous semiconductor film may be crystallized just by laser light irradiation, without performing thermal crystallization which employs a metal element for promoting crystallization.

Alternatively, the semiconductor films 1204a to 1204c can be obtained by crystallizing a semiconductor film by irradiation with continuous wave laser light or laser light that oscillates at a frequency of 10 MHz or more, which is scanned in one direction. In the case of such crystallization, crystals grow in the laser light scanning direction. Transistors may be disposed so that the scanning direction is aligned with the channel length direction (the direction in which carriers move when a channel formation region is formed).

Next, the gate insulating film 1205 covering the semiconductor films 1204a to 1204c is formed. The gate insulating film 1205 is formed to have a single-layer structure or a layered structure of a film containing oxide of silicon or nitride of silicon by a CVD method, a sputtering method, or the like. Specifically, the gate insulating film 1205 has a single-layer structure or a layered structure of a silicon oxide film, a silicon oxynitride film, or a silicon nitride oxide film.

Alternatively, the gate insulating film 1205 may be formed by oxidizing or nitriding the surfaces of the semiconductor films 1204a to 1204c by a plasma treatment. For example, the gate insulating film 1205 is formed by a plasma treatment introducing a mixed gas of a rare gas such as He, Ar, Kr or Xe and oxygen, nitrogen oxide ($NO_2$), ammonia, nitrogen, hydrogen or the like. In that case, plasma is excited by microwaves, so that plasma with a low electron temperature and a high density can be generated. By an oxygen radical (there is a case where an OH radical is included) or a nitrogen radical (there is a case where an NH radical is included) generated by this high-density plasma, the surface of the semiconductor film can be oxidized or nitrided.

By a treatment with such high-density plasma, an insulating film having a thickness of about 1 nm to 20 nm, typically about 5 nm to 10 nm is formed over the semiconductor films. Since the reaction in that case is a solid-phase reaction, the interface state density between the insulating film and the semiconductor films can be significantly decreased. The semiconductor films (crystalline silicon or polycrystalline silicon) are directly oxidized (or nitrided) by such a plasma treatment, whereby variation in thickness of the formed insulating film can be considerably reduced. In addition, oxidation does not proceed even at the crystal grain boundaries of crystalline silicon, which makes a very preferable condition. That is, by a solid-phase oxidation of the surface of the semiconductor film by the high-density plasma treatment shown here, an insulating film with good uniformity and low interface state density can be formed without causing oxidation reaction abnormally in a grain boundary.

As the gate insulating film 1205, only the insulating film formed by plasma treatment may be used, or a stacked-layer film of the insulating film formed by plasma treatment and an insulating film of silicon oxide, silicon oxynitride, silicon nitride, or the like stacked by a CVD method using plasma or thermal reaction may be used. In either case, a transistor is preferably formed to have a gate insulating film, which partly or entirely includes an insulating film formed by plasma treatment because characteristic variations can be reduced.

Moreover, when the semiconductor films 1204a to 1204c are formed in such a manner that a semiconductor film is irradiated with continuous wave laser light or laser light that oscillates at a frequency of 10 MHz or more and scanned in one direction for crystallization, thin film transistors (TFTs) with little characteristic variation and high field effect mobility can be obtained by using the gate insulating film subjected to the above plasma treatment. In addition, a PIN diode with PIN junction in horizontal direction can be obtained at the same time as the TFTs by using the semiconductor films 1204a to 1204c, which is described later.

Then, a conductive film is formed over the gate insulating film 1205. Here, a single conductive film with a thickness of approximate 100 nm to 500 nm, inclusive, is formed. Examples of a material which can be used for the conductive film include a material containing an element selected from tantalum (Ta), tungsten (W), titanium (Ti), molybdenum (Mo), aluminum (Al), copper (Cu), chromium (Cr), niobium (Nb), and the like; an alloy material mainly including any of these elements; or a compound material mainly including any of these elements. Alternatively, a semiconductor material typified by polycrystalline silicon doped with an impurity element such as phosphorus may be used. In the case where the conductive film has a layered structure, for example, it is possible to use a layered structure of a tantalum nitride film and a tungsten film, a layered structure of a tungsten nitride film and a tungsten film, or a layered structure of a molybdenum nitride film and a molybdenum film. For example, a layered structure of a tantalum nitride film having a thickness of 30 nm and a tungsten film having a thickness of 150 nm can be used. Since tungsten and tantalum nitride have high heat resistance, heat treatment for thermal activation can be performed after the conductive film is formed. The conductive film may have a layered structure of three or more layers, and for example, a layered structure of a molybdenum film, an aluminum film, and a molybdenum film may be used.

Next, a resist mask is formed over the above conductive film by photolithography and etching is performed to form a gate electrode and a gate wiring, whereby a gate electrodes 1207a to 1207c are formed over the semiconductor films 1204a to 1204c.

Then, a resist mask is formed by a photolithography method and an impurity element imparting n-type or p-type conductivity is added to the semiconductor films 1204a to 1204c at low concentration by ion doping or ion implantation. In this embodiment, an impurity element imparting n-type conductivity is added to the semiconductor films 1204a and 1204b at low concentration and an impurity element imparting p-type conductivity is added to the semiconductor film 1204a and the semiconductor film 1204c at low concentration. As the impurity element imparting n-type conductivity, an element which belongs to Group 15, for example, phosphorus (P) or arsenic (As) can be used. As the impurity element imparting p-type conductivity, an element which belongs to Group 13, for example, boron (B) can be used.

Note that an n-channel TFT and a p-channel TFT are formed at the same time in this embodiment. In that case, an impurity element imparting n-type conductivity is added using a mask covering semiconductor layers that are to be included in p-channel TFTs, and an impurity element imparting p-type conductivity is added using a mask covering semiconductor layers that are to be included in n-channel TFTs, whereby the impurity element imparting n-type conductivity and the impurity element imparting p-type conductivity can be selectively added.

Next, insulating films are formed to cover the gate insulating film 1205 and the gate electrodes 1207a to 1207c. The insulating films have a single-layer structure or a layered structure of a film including an inorganic material such as silicon, oxide of silicon, or nitride of silicon, or a film including an organic material such as an organic resin, which is formed by a CVD method, a sputtering method, or the like. Next, the insulating film is selectively etched by anisotropic etching mainly in the perpendicular direction, so that insulating films 1208a to 1208c (also referred to as sidewalls) which are in contact with the side surfaces of the gate electrodes 1207a to 1207c are formed. The insulating films 1208a to 1208c are used as masks for adding an impurity element in forming an LDD (lightly doped drain) region later.

Next, an impurity element imparting n-type conductivity is added to the semiconductor films 1204a and 1204b and an impurity element imparting p-type conductivity is added to the semiconductor film 1204a and 1204c with a mask formed using a resist which is formed by a photolithography method, the gate electrodes 1207a to 1207c, and the insulating films 1208a to 1208c as masks. Thus, channel formation regions 1206a, 1206e, and 1206i, an n-type impurity regions 1206c, 1206f, and 1206g, and p-type impurity regions 1206b, 1206j, and 1206k are formed (see FIG. 4C). The n-type impurity regions 1206f and 1206g function as a source and a drain of the n-channel TFT. The p-type impurity regions 1206j and 1206k function as a source and a drain of the p-channel TFT. In addition, the p-type impurity region 1206b and the n-type impurity region 1206c function as an anode and a cathode of the PIN diode, respectively. Further, impurity regions 1206d, 1206h, and 1206m formed under the insulating films 1208a to 1208c function as LDD regions. The concentration of the impurity element contained in the impurity regions 1206d, 1206h, and 1206m is lower than that of the impurity element contained in a source region and a drain region of the above-described TFT.

Next, an insulating film is formed to have a single-layer structure or a layered structure so as to cover the gate electrodes 1207a to 1207c, the insulating films 1208a to 1208c, and the like. In this embodiment, the case of a two-layer structure in which insulating films 1209 and 1210 are stacked is shown as an example. The insulating films can be formed by a CVD method. A silicon nitride oxide film having a thickness of 200 nm can be formed as the insulating film 1209. A silicon oxynitride film having a thickness of 400 nm can be formed as the insulating film 1210. Surfaces of these insulating films are, although depending on the thicknesses, formed along the surface of the layer provided below these insulating films. That is, since the insulating film 1209 is thin, its surface is in almost exact accordance with to the surface shape of the gate electrodes 1207. As the thickness of the film becomes larger, its surface becomes more planar; therefore, the surface of the insulating film 1210 is almost planar. However, unlike an organic material, the insulating film 1210 does not have a planar surface shape. That is, if it is desired that the surface of the insulating film 1210 be planar, an organic material such as polyimide, polyamide, benzocyclobutene, acrylic, or epoxy; a siloxane material; or the like may be used for the insulating layer 1210. Further, as a formation method of these insulating films, a sputtering method, an SOG method, a droplet discharge method, a screen printing method, or the like can be employed in addition to a CVD method.

Then, after the insulating film 1209, the insulating film 1210, and the like are etched by a photolithography method and contact holes which reach the impurity regions 1206b, 1206c, 1206f, 1206g, 1206j, and 1206k are formed, conductive films 1231a, which functions as a source electrode and a drain electrode of a thin film transistor or as an anode and a cathode of the PIN diode, and a conductive film 1231b which functions as a connection wiring are formed. The conductive films 1231a and the conductive film 1231b are formed by forming a conductive film so as to fill the contact holes and then selectively etching the conductive film (a contact hole for the conductive film 1231b is not illustrated in FIG. 5A). Note that, before the conductive film is formed, silicide may be formed on the surfaces of the semiconductor films 1204a to 1204c, which are exposed in the contact holes, so that the resistance can be reduced. The conductive films 1231a and 1231b are preferably formed using a low resistance material in order to reduce signal delay. Since a low-resistance material often has low heat resistance, a high heat resistance material is preferably provided over and below the low-resistance material. For example, a structure is preferable in which a film of aluminum, which is a low-resistance material, is formed with a thickness of 300 nm and a film of titanium with a thickness of 100 nm is formed over and below the aluminum film. The conductive film 1231b serving as the connection wiring can be formed to have the same stacked structure as the conductive film 1231a so that resistance of the connection wiring can be reduced and heat resistance thereof can be improved. The conductive films 1231a and 1231b can be formed of an element selected from tungsten (W), tantalum (Ta), molybdenum (Mo), nickel (Ni), platinum (Pt), copper, (Cu), gold (Au), silver (Ag), manganese (Mn), neodymium (Nd), carbon (C), silicon (Si), or an alloy material or a compound material which includes any of these elements as a main component, and has a single-layer structure or a layered structure. The alloy containing aluminum as its main component corresponds to, for example, a material that contains aluminum as its main component and also contains nickel, or an alloy material that contains aluminum as its main component and also contains nickel and one or both of carbon and silicon. The conductive films 1231a and 1231b can be formed by a CVD method, a sputtering method, or the like.

In this manner, an element substrate including a PIN diode 1230a, an n-channel thin film transistor 1230b, and a p-channel thin film transistor 1230c is obtained (see FIG. 5A).

Note that a heat treatment may be performed for recovering the crystallinity of the semiconductor films 1204a to 1204c, activating the impurity element added to the semiconductor films 1204a to 1204c, and hydrogenating the semiconductor films 1204a to 1204c before the insulating films 1209 is formed or after the insulating film 1209 is formed. The heat treatment may be performed by thermal annealing, laser annealing, RTA, or the like.

Next, insulating films 1212 and 1213 are formed so as to cover the conductive films 1231a and the conductive film 1231b (see FIG. 5B). Here is an example in which a silicon nitride film having a thickness of 100 nm is used as the insulating film 1212 and a polyimide film having a thickness of 1500 nm is used as the insulating film 1213. A surface shape of the insulating film 1213 preferably has high planarity. Therefore, besides the feature of polyimide as an organic material, even with a thick-film structure, for example, a structure with a film thickness of 750 nm to 3000 nm (specifically a thickness of 1500 nm), the insulating film 1213 has great flatness. An opening portion is formed in the insulating films 1212 and 1213 as appropriate. In this embodiment, the case where opening portions 1214a and 1214b exposing the conductive film 1231b are formed is described as an example. In such an opening portions 1214a and 1214b (specifically, in a region 1215a and a region 1215b which are surrounded by dotted lines), an end portion of the insulating film 1212 is covered with the insulating film 1213. By covering the end portion of the insulating film 1212 which is a lower layer with the insulating film 1213 which is an upper layer, disconnection in a wiring which is to be formed in the opening portions 1214a and 1214b can be prevented. In this embodiment, since polyimide, which is an organic material, is used for the insulating film 1213, in the opening portions 1214a and 1214b, the insulating film 1213 can have a gently tapered shape and disconnection can be efficiently prevented. Materials for the insulating film 1213 that can prevent disconnection include organic materials such as benzocyclobutene, acrylic, or epoxy; a siloxane material; and the like in addition to polyamide. Further, as the insulating film 1212, a silicon oxynitride film or a silicon nitride oxide film may be used instead of the silicon nitride film. In addition, the insulating films 1212 and 1213 may be formed by a CVD method, a sputtering method, an SOG method, a droplet discharge method, a screen-printing method, or the like.

Next, a conductive film 1217a and a conductive film 1217b are formed over the insulating film 1213, and an insulating film 1218 is formed over the conductive films 1217a and 1217b (see FIG. 5C). The conductive films 1217a and 1217b can be formed using the same material as the conductive films 1231a and the conductive film 1231b. For example, a layered structure of a titanium film having a thickness of 100 nm, an aluminum film having a thickness of 200 nm, and a titanium film having a thickness of 100 nm can be employed. Since the conductive film 1217a and the conductive film 1217b are connected to the conductive film 1231a and the conductive film 1231b, respectively, in the opening portions 1214a and 1214b, respectively, contact resistance can be reduced because titanium is in contact with each other. Moreover, since a current based on a signal between the thin film transistor and an antenna (formed later) flows through the conductive films 1217a and 1217b, the wiring resistance is preferably low. Therefore, a low resistance material such as aluminum is preferably used. The conductive film 1217 can be formed of an element selected from tungsten (W), tantalum (Ta), molybdenum (Mo), nickel (Ni), platinum (Pt), copper, (Cu), gold (Au), silver (Ag), manganese (Mn), neodymium (Nd), carbon (C), silicon (Si), or an alloy material or a compound material which includes any of these elements as a main component, and has a single-layer structure or a layered structure. The alloy containing aluminum as its main component corresponds to, for example, a material that contains aluminum as its main component and also contains nickel, or an alloy material that contains aluminum as its main component and also contains nickel and one or both of carbon and silicon. The conductive films 1217a and the conductive film 1217b can be formed by CVD, sputtering, or the like. Since the insulating film 1218 needs to have planarity, it is preferably formed using an organic material, and the case where 2000-nm-thick polyimide is used is described as an example. The insulating film 1218 is formed to a thickness of 2000 nm, which is larger than the thickness of the insulating film 1213 because unevenness of a surface of the opening portions 1214a 1214b in the insulating film 1213 having a thickness of 1500 nm, and of the conductive film 1217a formed in the opening 1214a and the conductive film 1217b formed in the opening 1214b should to be planar. Thus, the insulating film 1218 may have a thickness 1.1 to 2 times, preferably, 1.2 to 1.5 times the thickness of the insulating film 1213. In a case where the insulating film 1213 has a thickness of from 750 nm to 3000 nm, inclusive, the insulating film 1218 preferably has a thickness of from 900 nm to 4500 nm, inclusive. A material having higher planarity may be used for the insulating film 1218, taking thought of the thickness. Materials having high planarity that can be used for the insulating film 1218 include an organic material such as polyamide, benzocyclobutene, acrylic, or epoxy; a siloxane material; and the like in addition to polyimide. In a case where an antenna is formed over the insulating film 1218, the planarity of a surface of the insulating film 1218 needs to be considered.

In addition, the insulating film 1218 is preferably used to cover an end portion of the insulating film 1213 outside the antenna in a circuit portion (not illustrated). When the insulating film 1213 is covered, it is preferable to provide a margin of two or more times as large as the total thickness of the insulating film 1213 and the insulating film 1218 for an outer side of the end of the insulating film 1213. In this embodiment, the insulating film 1213 is formed to a thickness of 1500 nm and the insulating film 1218 is formed to a thickness of 2000 nm; thus, the insulating film 1218 covering the end portion of the insulating film 1213 is located to have a distance (d=7000 nm) from the end of the insulating film 1213. With such a structure, a margin of a process can be ensured, and further, that entry of moisture and oxygen can be prevented.

Figure 6:
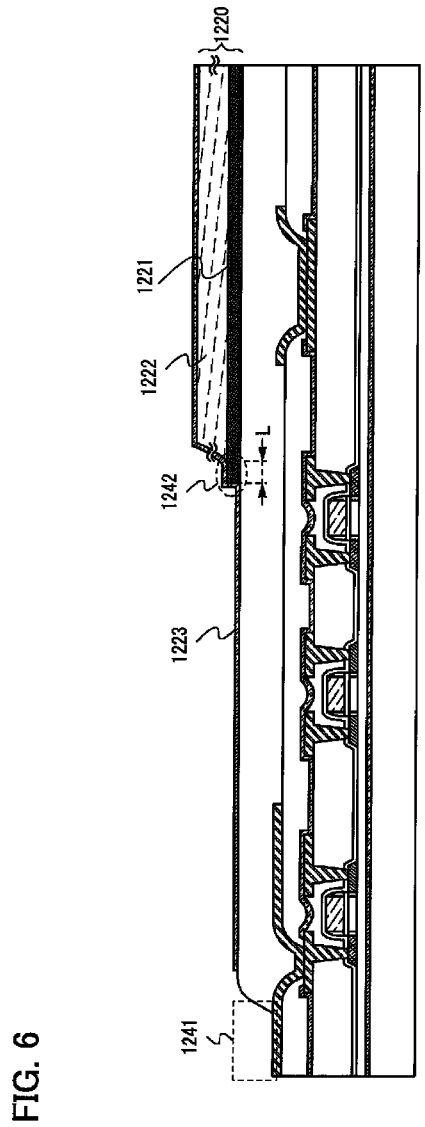
FIG. 6 is a diagram illustrating a manufacturing step of a data processing device.

Next, an antenna 1220 is formed over the insulating film 1218 (see FIG. 6). The antenna 1220 and the conductive film 1217b are electrically connected to each other through an opening portion (the opening portion is not shown). The opening portion is preferably provided below the antenna 1220 to achieve integration; however, since the insulating layer 1213 is formed to have a thickness to some extent for planarization as described above, the contact hole is formed in a portion where the thickness of the insulating layer is large when the opening portion is formed directly over the opening portion 1214b, which easily causes defect in opening. Therefore, the opening portion for connecting the antenna 1220 to the conductive film 1217b is preferably provided in a portion different from the opening portion 1214b. Note that although the antenna 1220 may be directly connected to the conductive films 1231a, providing of the conductive film 1217b as in this embodiment is preferable because a margin can be secured for formation of the opening portion for connection with the antenna 1220, and high integration can be achieved. Accordingly, another conductive film may be further provided over the conductive film 1217b to be connected to the antenna 1220. That is, the antenna 1220 may be electrically connected to the conductive film 1231a included in the thin film transistor and a connection structure in which a plurality of conductive films are interposed between the antenna 1220 and the conductive film 1231a can realize the high integration. The plurality of conductive films including the conductive film 1217b preferably has a small thickness because the thickness of the data processing device becomes large if the thicknesses of the conductive films are large. Thus, the conductive film 1217 and the like preferably have a small thickness as compared to the conductive film 1231a.

The antenna 1220 can employ a layered structure of a first conductive film 1221 and a second conductive film 1222. In this embodiment, the case of a layered structure of a titanium film having a thickness of 100 nm as the first conductive film 1221 and an aluminum film having a thickness of 5000 nm as the second conductive film 1222 is described as an example. Titanium can improve moisture resistance of the antenna and adhesiveness between the insulating film 1218 and the antenna 1220. Further, titanium can reduce contact resistance with the conductive film 1217 because the titanium film formed as the uppermost layer of the conductive film 1217 is in contact with the titanium in the antenna, that is, the same material is in contact with each other. A titanium film which is employed as the first conductive film 1221 is formed by dry etching, so an end portion thereof tends to have a steep angle. Aluminum is a low-resistance material, so it is suitable for the antenna. By forming the aluminum film thickly, resistance can be further lowered. Resistance of the antenna is preferably lowered because a communication distance can be increased. As a result of forming such an aluminum film by a wet etching method, sidewalls in the end portion tends to be tapered. A taper in this embodiment is a shape such that the side surface is curved inwardly toward the aluminum, that is, a shape with a curved recessed side surface. The wet etching is performed on the aluminum film such that an end portion of the aluminum film is inside of the end portion of the titanium film (a region 1242). For example, it is preferable that the end portion of the aluminum be inside the titanium and the distance between the ends of the aluminum and the titanium be a distance (a distance L) one-sixth to one-half the thickness of the aluminum. In this embodiment, the end of the aluminum may be provided inside the end of the titanium and the distance therebetween may be the distance L of 0.8 μm to 2 μm, inclusive. Since the end portion of the titanium is projected from the end portion of the aluminum, disconnection of an insulating film which is formed later can be prevented, and further, the durability of the antenna can be increased.

The antenna can be formed using, as a conductive material, a material including a metal element such as silver, copper, gold, platinum, nickel, palladium, tantalum, or molybdenum; an alloy material including any of these metal elements; or a compound material including any of these metal elements, in addition to aluminum and titanium. As the formation method of the antenna, a CVD method, a sputtering method, a printing method such as screen printing or gravure printing, a droplet discharge method, a dispenser method, a plating method, or the like can be given. Although a layered structure is described as an example in this embodiment, a single-layer structure of any of the above materials may be employed.

An insulating film 1223 is formed so as to cover the antenna 1220. In this embodiment, a silicon nitride film of 200 nm is formed as the insulating film 1223. The insulating film 1223 is preferably formed because it enhances a moisture resistance of the antenna. Since the end portion of the titanium film projects from the aluminum film, the insulating film 1223 can be formed without disconnections. In addition to a silicon nitride film, a silicon oxynitride film, a silicon nitride oxide film, other inorganic material can be used for the insulating film 1223.

Note that before the formation of the insulating film 1223, an opening portion 1241 is provided in a portion of the insulating film 1218, which is to be the terminal portion later, to expose the conductive film 1217a. Similarly, an opening portion is also provided in the insulating film 1223 and the terminal portion is formed, so that the conductive film 1217a is eventually the top surface. The PIN diode 1230a which has been formed in advance is used as a protection diode for the terminal portion formed using the conductive film 1217a.

In the above manner, data processing devices which are formed by using an insulating substrate can be completed.

Embodiment 5

In this embodiment, a method for manufacturing a flexible data processing device with a higher reliability and a high yield is described with reference to FIGS. 7A to 7D. In this embodiment, a semiconductor integrated circuit including a CMOS (complementary metal oxide semiconductor) will be described as an example a structure of the data processing device.

Figure 7A:
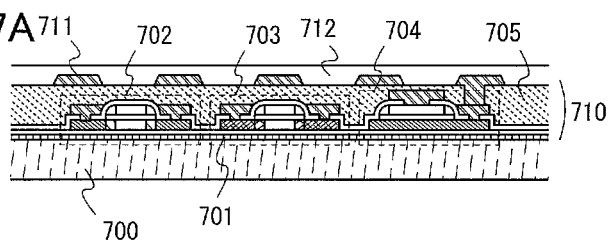
FIGS. 7A to 7D are diagrams illustrating manufacturing steps of a data processing device.
Figure 7B:
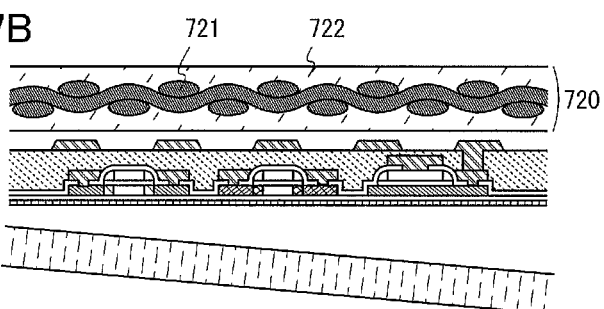

Transistors 702 and 703, a capacitor 704, and an insulating layer 705 are provided over a substrate 700 with a separation layer 701 interposed therebetween, and a semiconductor integrated circuit 710 is formed (see FIG. 7A).

The transistors 702 and 703 are thin film transistors, each of which includes a source region and a drain region, a low-concentration impurity region, a channel formation region, a gate insulating layer, a gate electrode, and a source electrode and a drain electrode. The source region and the drain region are in contact with wirings serving as the source electrode and drain electrode, respectively, and electrically connected thereto.

The transistor 702 is an n-channel transistor and includes an impurity element imparting n-type conductivity (such as phosphorus (P) or arsenic (As)) in the source and drain regions and the low-concentration impurity region. The transistor 703 is a p-channel transistor and includes an impurity element imparting p-type conductivity (such as boron (B), aluminum (Al), or gallium (Ga)) in the source and drain regions and the low-concentration impurity region.

The capacitor 704 is formed through a similar step to that of the transistors 702 and 703, and one electrode of the capacitor 704 is formed using a semiconductor layer and the other electrode of the capacitor 704 is formed using a gate electrode. At this time, for efficiently ensuring a capacitance value, an impurity element may be added to the semiconductor layer for forming the capacitor 704 before the gate electrode layer is formed. Through this process, an impurity element is added also to the semiconductor layer arranged in a region in a lower layer of the layer of the gate electrode, and the capacitor 704 can serve as a capacitor effectively.

In addition, although not shown in FIG. 7A, a PIN diode can be formed by addition of an impurity element in a semiconductor layer in a process which is similar to that for forming the transistors 702 and 703.

Then, an antenna 711 formed using a conductive film is formed on the insulating layer 705 and a protection film 712 is formed on the antenna 711. The antenna 711 is electrically connected to the semiconductor integrated circuit. In FIG. 7A, the antenna 711 is electrically connected to the one electrode of the capacitor 704.

Then, an insulator 720 is formed on the protection film 712. A structure body in which a fibrous body 721 is impregnated with an organic resin 722 may be used as the insulator 720, for example.

After the protection film 712 and the insulator 720 are bonded to each other, the semiconductor integrated circuit 710, the antenna 711, and the protection film 712 are separated from the substrate 700 with the separation layer 701 used as the interface. Thus, the semiconductor integrated circuit 710, the antenna 711, and the protection film 712 are provided on the insulator 720 side (see FIG. 7B).

The protective film 712 and the insulator 720 may be bonded to each other using an adhesive which is not particularly illustrated or may be bonded by compression bonding or thermocompression bonding.

Figure 7C:
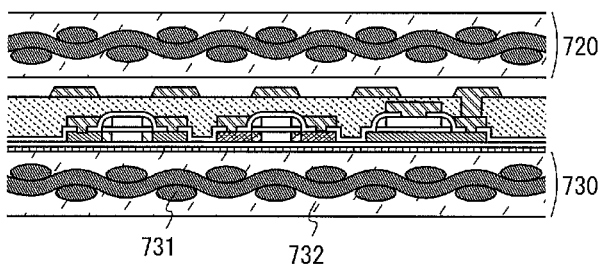
Figure 7D:
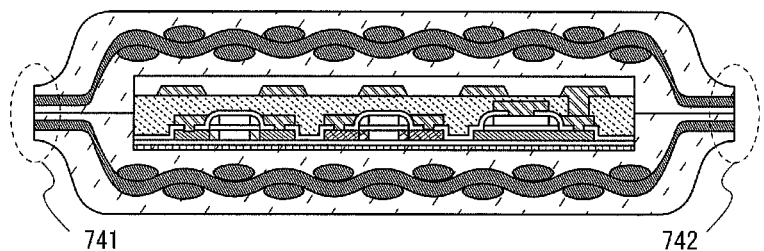

After that, an exposed separation surface of the semiconductor integrated circuit 710 is bonded to the insulator 730 with the separation layer 701 interposed therebetween, whereby the semiconductor integrated circuit 710, the antenna 711, and the protection film 712 are interposed between the insulator 720 and the insulator 730 (see FIG. 7C).

A structure body in which a fibrous body 731 is impregnated with an organic resin 732 may be used as the insulator 730, for example, as in the case of the insulator 720.

Although not particularly shown, structure bodies in which a plurality of semiconductor integrated circuits 710, antennas 711, and protection films 712 are formed being arranged in a plane direction are interposed between the insulators 720 and 730; and by dividing them into individual pieces, semiconductor integrated circuit chips in each of which the semiconductor integrated circuit 710, the antennas 711, and the protection film 712 are interposed between the insulators 720 and 730 are manufactured. There is no particular limitation on a dividing means as long as the structural bodies can be divided physically. In this embodiment, as a preferable example, the division is performed by laser light irradiation along a dividing line.

With the laser light irradiation for dividing the structure bodies interposed between the insulators 720 and 730, the insulator 720 and the insulator 730 are melted on divided surfaces 741 and 742 of the semiconductor integrated circuit chip, and are welded to each other. Thus, each of the semiconductor integrated circuit chips has a structure in which the semiconductor integrated circuit 710, the antennas 711, and the protection film 712 are sealed entirely by the insulator 720 and the insulator 730 (see FIG. 7D).

Although not particularly illustrated here, an insulator may be further provided outside or inside the insulators 720 and 730 in order to cover the whole surfaces of the semiconductor integrated circuit 710, the antenna 711, and the protective film 712 more favorably.

In addition, as described above, in the case where a terminal for connection with an external device is provided over a surface of the data processing device, a surface of the terminal is covered with the insulator 720 and the like; therefore, the terminal has to be formed to be eventually exposed (not shown). For example, an opening may be provided in the insulator 720 over the terminal by laser irradiation or the like employed in separation. Alternatively, an opening portion may be provided in a region of the insulator 720 above the terminal in advance and the semiconductor integrated circuit 710 may be sandwiched. It is needless to say that a method is not limited to the above as long as the insulator 720 can be formed so as not to cover the terminal portion.

Through the above process in which insulators are provided with a semiconductor integrated circuit interposed therebetween, adverse effects such as damage of the semiconductor integrated circuit or defects in characteristics by an external stress or internal stress can be prevented. Thus, a data processing device can be manufactured with high reliability and high yield.

Note that, the data processing device described in this embodiment can be a flexible data processing device by using flexible insulators.

Semiconductor layers included in the transistors 702 and 703 and the capacitor 704 can be formed using any of the following materials: an amorphous semiconductor (hereinafter also referred to as an AS) manufactured by a vapor-phase growth method using a semiconductor material gas typified by silane or germane or by a sputtering method; a polycrystalline semiconductor formed by crystallizing the amorphous semiconductor with the use of light energy or thermal energy; a microcrystalline (also referred to as semiamorphous) (hereinafter also referred to as an SAS) semiconductor; or the like. The semiconductor layer can be formed by a sputtering method, an LPCVD method, a plasma CVD method, or the like.

The microcrystalline semiconductor film has a metastable state of an intermediate between an amorphous structure and a single crystal structure when Gibbs free energy is considered. That is, the microcrystalline semiconductor film is a semiconductor having a third state which is stable in terms of free energy and has a short range order and lattice distortion. Columnar-like or needle-like crystals grow in a normal direction with respect to a substrate surface. The Raman spectrum of microcrystalline silicon, which is a typical example of a microcrystalline semiconductor, is shifted to a small wavenumber region below 520 $cm^{-1}$ which represents single-crystalline silicon. That is, the peak of the Raman spectrum of the microcrystalline silicon exists between 520 $cm^{-1}$ which represents single crystal silicon and 480 $cm^{-1}$ which represents amorphous silicon. In addition, microcrystalline silicon contains hydrogen or halogen of at least 1 atomic percent or more in order to terminate a dangling bond. Moreover, microcrystalline silicon contains a rare gas element such as helium, argon, krypton, or neon to further promote lattice distortion, so that stability is increased and a favorable microcrystalline semiconductor can be obtained.

The microcrystalline semiconductor film can be formed by a high-frequency plasma CVD method with a frequency of several tens to several hundreds of megahertz or a microwave plasma CVD apparatus with a frequency of 1 GHz or more. Typically, the microcrystalline semiconductor film can be formed by using a gas obtained by diluting a silicon hydride such as $SiH_4$, $Si_2H_6$, $SiH_2Cl_2$, $SiHCl_3$, $SiCl_4$, $SiF_4$, or the like, with hydrogen. Alternatively, with a dilution with one or a plural kinds of rare gas elements selected from helium, argon, krypton, or neon in addition to silicon hydride and hydrogen, the microcrystalline semiconductor can be formed. In that case, the flow ratio of hydrogen to silicon hydride is 5:1 to 200:1, preferably 50:1 to 150:1, more preferably 100:1.

Hydrogenated amorphous silicon can be typically exemplified as the amorphous semiconductor, while polysilicon (polycrystalline silicon) or the like can be typically exemplified as a crystalline semiconductor. Examples of polysilicon include so-called high-temperature polysilicon that contains polysilicon as a main component and is formed at a process temperature greater than or equal to 800° C., so-called low-temperature polysilicon that contains polysilicon as a main component and is formed at a process temperature less than or equal to 600° C., polysilicon obtained by crystallizing amorphous silicon by using an element that promotes crystallization or the like, and the like. It is needless to say that as mentioned above, a microcrystalline semiconductor or a semiconductor containing a crystal phase in a part of a semiconductor layer can be used.

As a material of the semiconductor, as well as an element of silicon (Si), germanium (Ge), or the like, a compound semiconductor such as GaAs, InP, SiC, ZnSe, GaN, or SiGe can be used. Alternatively, an oxide semiconductor such as zinc oxide (ZnO), tin oxide ($SnO_2$), magnesium zinc oxide, gallium oxide, or indium oxide, an oxide semiconductor formed of any of the above oxide semiconductors, or the like may be used. For example, an oxide semiconductor formed of zinc oxide, indium oxide, and gallium oxide may be used. In the case of using zinc oxide for the semiconductor layer, a gate insulating layer is preferably formed using $Y_2O_3$, $Al_2O_3$, $TiO_2$, a stacked layer of any of the above substances, or the like. For a gate electrode layer, a source electrode layer, and a drain electrode layer, ITO, Au, Ti, or the like is preferably used. Alternatively, ZnO to which In, Ga, or the like is added may be used.

When a crystalline semiconductor layer is used as the semiconductor layer, a variety of methods (a laser crystallization method, a thermal crystallization method, a thermal crystallization method using an element promoting crystallization such as nickel, or the like) may be employed as a method for manufacturing the crystalline semiconductor layer. Alternatively, a microcrystalline semiconductor, which is an SAS, may be crystallized by laser irradiation to increase crystallinity. In the case where elements which promote crystallization are not added, heat treatment is applied to the amorphous silicon film at 500° C. for one hour under a nitrogen atmosphere before irradiating the amorphous silicon film with laser light, so as to discharge hydrogen until the concentration of hydrogen contained in the amorphous silicon film becomes $1 \times 1020$ atoms/$cm^3$ or less. This is because, if the amorphous silicon film contains much hydrogen, the amorphous semiconductor film is broken by laser irradiation.

As a method of introducing a metal element into an amorphous semiconductor layer, any method by which the metal element can be kept on the surface or the inside of the amorphous semiconductor layer can be used. For example, a sputtering method, a CVD method, a plasma treatment method (including a plasma CVD method), an adsorption method, or a method of applying a metal-salt solution can be used. Among them, the method using a solution is simple and advantageous in that the concentration of the metal element can be easily controlled. Further, in order to improve the wettability of the surface of the amorphous semiconductor layer and spread an aqueous solution over the entire surface of the amorphous semiconductor layer, it is preferable to form an oxide film by UV irradiation under an oxygen atmosphere, a thermal oxidation method, treatment with ozone water containing a hydroxyl radical or with hydrogen peroxide, or the like.

The crystallization may be performed by adding an element which promotes crystallization (also referred to as a catalyst element or a metal element) to an amorphous semiconductor layer and performing a heat treatment (at 550° C. to 750° C. for 3 minutes to 24 hours) in a crystallization step in which the amorphous semiconductor layer is crystallized to form a crystalline semiconductor layer. As the element which promotes (accelerates) the crystallization, one or more of iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element that promotes crystallization from the crystalline semiconductor layer, a semiconductor layer containing an impurity element is formed in contact with the crystalline semiconductor layer and used as a gettering sink. As the impurity element, an impurity element imparting n-type conductivity, an impurity element imparting p-type conductivity, a rare gas element, or the like can be used. For example, one or a plurality of kinds of elements such as phosphorus (P), nitrogen (N), arsenic (As), antimony (Sb), bismuth (Bi), boron (B), helium (He), neon (Ne), argon (Ar), krypton (Kr), and xenon (Xe) can be used. A semiconductor layer containing a rare gas element is formed on the crystalline semiconductor layer containing the element which promotes crystallization, and heat treatment (at 550° C. to 750° C. for 3 minutes to 24 hours) is performed. The element which promotes crystallization in the crystalline semiconductor layer moves into the semiconductor layer containing a rare gas element; thus, the element which promotes crystallization in the crystalline semiconductor layer is removed or reduced. After that, the semiconductor layer containing a rare gas element, which serves as a gettering sink, is removed.

The amorphous semiconductor layer may be crystallized by a combination of thermal treatment and laser light irradiation. Alternatively, either thermal treatment or laser light irradiation may be performed plural times.

Moreover, the crystalline semiconductor layer may be directly formed over the substrate by a plasma method. Alternatively, the crystalline semiconductor layer may be selectively formed over a substrate by using a plasma treatment method.

The gate insulating layer may be formed using silicon oxide or a layered structure of silicon oxide and silicon nitride. The gate insulating layer may be formed by a plasma CVD method or a low pressure CVD method or may be formed by depositing an insulating layer by solid phase oxidation or solid phase nitridation by plasma treatment. This is because a gate insulating layer formed by oxidation or nitridation of a single crystal semiconductor layer by plasma treatment is dense, has a high withstand voltage, and is excellent in reliability. For example, the surface of the semiconductor layer is oxidized or nitrided using nitrous oxide ($N_2O$) diluted with Ar by 1 to 3 times (flow ratio) by application of a microwave (2.45 GHz) power of 3 kW to 5 kW at a pressure of 10 Pa to 30 Pa. By this treatment, an insulating film having a thickness of 1 nm to 10 nm (preferably 2 nm to 6 nm) is formed. Further, nitrous oxide ($N_2O$) and silane ($SiH_4$) are introduced, and a silicon oxynitride film is formed by a vapor deposition method by application of a microwave (2.45 GHz) power of 3 kW to 5 kW at a pressure of 10 Pa to 30 Pa; accordingly, the gate insulating layer is formed. By combining solid-phase reaction and vapor deposition, a gate insulating layer having low interface state density and excellent withstand voltage can be formed.

As the gate insulating layer, a high permittivity material such as zirconium dioxide, hafnium oxide, titanium dioxide, or tantalum pentoxide may also be used. When a high permittivity material is used for the gate insulating layer, a gate leak current can be reduced.

The gate electrode layer can be formed by a CVD method, a sputtering method, a droplet discharge method, or the like. The gate electrode layer may be formed of an element selected from Ag, Au, Cu, Ni, Pt, Pd, Ir, Rh, W, Al, Ta, Mo, Cd, Zn, Fe, Ti, Si, Ge, Zr, and Ba; or an alloy material or a compound material containing any of the elements as a main component. Alternatively, a semiconductor film typified by a polycrystalline silicon film doped with an impurity element such as phosphorus, or AgPdCu alloy may be used. Alternatively, a single layer structure or a structure of a plurality of layers may be employed: for example, a two-layer structure of a tungsten nitride film and a molybdenum film. Alternatively, a three-layer structure in which a tungsten film with a thickness of 50 nm, an aluminum-silicon alloy (Al—Si) film with a thickness of 500 nm, and a titanium nitride film with a thickness of 30 nm are sequentially stacked may be employed. In the case where a three-layer structure is employed, tungsten nitride film may be used instead of the tungsten film of a first conductive film. An aluminum-titanium alloy (Al—Ti) film may be used instead of the aluminum-silicon (Al—Si) alloy film for the second conductive film. Moreover, a titanium film may be used instead of the titanium nitride film for the third conductive film.

A light-transmitting material having a property of transmitting visible light can also be used for the gate electrode layer. As the light-transmitting conductive material, indium tin oxide (ITO), indium tin oxide containing silicon oxide (ITSO), organic indium, organic tin, zinc oxide, or the like can be used. Alternatively, indium zinc oxide (IZO) containing zinc oxide (ZnO), zinc oxide (ZnO), ZnO doped with gallium (Ga), tin oxide ($SnO_2$), indium oxide containing tungsten oxide, indium zinc oxide containing tungsten oxide, indium oxide containing titanium oxide, indium tin oxide containing titanium oxide, or the like may be used.

In the case where etching processing is needed for forming the gate electrode layer, a mask may be formed and dry etching or wet etching may be performed. The electrode layers can be etched into tapered shapes by an inductively coupled plasma (ICP) etching method with the etching condition (the amount of electric power applied to a coiled electrode, the amount of electric power applied to an electrode on a substrate side, the temperature of the electrode on the substrate side, or the like) appropriately adjusted. Note that an etching gas can be selected as appropriate from among a chlorine source gas typified by $Cl_2$, $BCl_3$, $SiCl_4$, or $CCl_4$; a fluorine source gas typified by $CF_4$, $SF_6$, or $NF_3$; and $O_2$.

Although a single gate structure is described in this embodiment, a multi-gate structure such as a double gate structure may also be employed for the transistor. In that case, gate electrode layers may be provided above and below the semiconductor layer or a plurality of gate electrode layers may be provided only on one side of (above or below) the semiconductor layer.

Further, a structure in which a silicide is provided for the source and drain regions of the transistor may also be employed. A silicide is formed by forming a conductive film over the source and drain regions of the semiconductor layer and making silicon in the source and drain regions, which are partly exposed, of the semiconductor layer and the conductive film react by heat treatment, a GRTA method, an LRTA method, or the like. The silicide may be formed by laser irradiation or light irradiation with a lamp. As a material of the conductive film used for forming a silicide, the following can be used: titanium (Ti), nickel (Ni), tungsten (W), molybdenum (Mo), cobalt (Co), zirconium (Zr), hafnium (Hf), tantalum (Ta), vanadium (V), neodymium (Nd), chromium (Cr), platinum (Pt), palladium (Pd), or the like.

The wiring layers that serve as source and drain electrode layers can be formed in such a manner that a conductive film is formed by a PVD method, a CVD method, an evaporation method, or the like and then the conductive film is etched into a desired shape. Alternatively, the wiring layers can be formed selectively at a predetermined place by a printing method, an electroplating method, or the like. Furthermore, a reflow method or a damascene method can also be used. Materials of the wiring layers include a metal such as Ag, Au, Cu, Ni, Pt, Pd, Ir, Rh, W, Al, Ta, Mo, Cd, Zn, Fe, Ti, Zr, or Ba, a semiconductor such as Si or Ge, or an alloy or a nitride thereof. Further, a light-transmitting material can also be used.

As the light-transmitting conductive material, indium tin oxide (ITO), indium tin oxide containing silicon oxide (ITSO), indium zinc oxide (IZO) containing zinc oxide (ZnO), zinc oxide (ZnO), ZnO doped with gallium (Ga), tin oxide ($SnO_2$), indium oxide containing tungsten oxide, indium zinc oxide containing tungsten oxide, indium oxide containing titanium oxide, indium tin oxide containing titanium oxide, or the like can be used.

In the data processing device, a memory element or the like formed using a semiconductor layer can be used as a semiconductor element in addition to field effect transistor. In this manner, a data processing device having functions required for various applications can be manufactured and provided.

Note that the present invention is not limited to the descriptions in the above embodiments, and it is easily understood by those skilled in the art that modes and details thereof can be modified in various ways without departing from the purpose and the scope of the present invention. Thus, the present invention should not be construed as being limited to the description in the above embodiments and example.

This application is based on Japanese Patent Application serial no. 2009-092046 filed with Japan Patent Office on Apr. 6, 2009, the entire contents of which are hereby incorporated by reference.

What is claimed is:

1. A data processing device comprising:
an antenna configured to transmit and receive a first signal to and from a first terminal device through wireless communication; and
an integrated circuit connected to the antenna and configured to execute a process in accordance with the first signal, the integrated circuit including a terminal portion configured to transmit and receive a second signal to and from a second terminal device when coupled to the terminal portion,
wherein the first signal has a carrier wave and a modulated wave generated by modulating an amplitude or a frequency of the carrier wave in accordance with data,
wherein the second signal is a digital signal,
wherein the integrated circuit comprises a transistor, wherein a first insulating film is over the transistor, wherein a first conductive film is over the first insulating film, wherein a second insulating film having a first opening is over the first conductive film,
wherein a second conductive film is over a portion of the second insulating film,
wherein a third insulating film having a second opening is over the remaining portion of the second insulating film and the second conductive film,
wherein the first conductive film comprises an exposed surface where the first opening, the second opening and the first conductive film overlap one another,
wherein the terminal portion comprises the first conductive film including the exposed surface for coupling the second terminal device and transmitting and receiving the second signal to and from the second terminal device,
wherein the antenna comprises the second conductive film, and
wherein the terminal portion includes a power supply terminal, a terminal electrically connected to a signal line and a protection circuit electrically connected to the power supply terminal and the signal line.

2. The data processing device according to claim 1,
wherein the transistor is a first thin film transistor formed over an insulating surface,
wherein the protection circuit has a structure in which at least one diode selected from a PN diode, a PIN diode, a Schottky barrier diode, and a second thin film transistor diode-connected by short-circuit between a gate and a drain of a thin film transistor formed over the insulating surface is provided between the power supply terminal and the terminal for transmitting and receiving the second signal so as to be reverse biased in a normal state, and
wherein each of the first thin film transistor and the diode has a semiconductor film formed in the same step.

3. The data processing device according to claim 2, wherein a p-type impurity region and a n-type impurity region included in the PN diode and the PIN diode are formed in a step in which an impurity region of the second thin film transistor is formed and the p-type impurity region and the n-type impurity region are formed in the semiconductor film.

4. The data processing device according to claim 1, wherein the transistor comprises a semiconductor film including an oxide semiconductor.

5. The data processing device according to claim 4, wherein the oxide semiconductor comprises zinc oxide, indium oxide, and gallium oxide.

6. An IC card comprising the data processing device according to claim 1 and a base material supporting the data processing device, wherein the base material has a structure body for supporting and fixing the second terminal device when the second terminal device is connected in the terminal portion.

7. A communication system using the data processing device according to claim 1, the first terminal device, and the second terminal device.

8. A data processing device comprising:
an antenna for wireless communication; and
an integrated circuit connected to the antenna and configured to execute a process in accordance with a signal from the antenna, the integrated circuit including a terminal portion comprising:
a first terminal configured to communicate with a first terminal device by direct contact,
a second terminal configured to supply a power source to a second terminal device, and
a protection circuit configured to release an electrical static charge in the first terminal to the second terminal,
wherein the integrated circuit comprises a transistor, wherein a first insulating film is over the transistor, wherein a first conductive film is over the first insulating film,
wherein a second insulating film having a first opening is over the first conductive film,
wherein a second conductive film is over a portion of the second insulating film,
wherein a third insulating film having a second opening is over the remaining portion of the second insulating film and the second conductive film,
wherein the first conductive film comprises an exposed surface where the first opening, the second opening and the first conductive film overlap one another,
wherein the terminal portion comprises the first conductive film including the exposed surface for supplying the power source to the second terminal device, and
wherein the antenna comprises the second conductive film.

9. The data processing device according to claim 8,
wherein the transistor is a first thin film transistor formed over an insulating surface,
wherein the protection circuit has a structure in which at least one diode selected from a PN diode, a PIN diode, a Schottky barrier diode, and a second thin film transistor diode-connected by short-circuit between a gate and a drain of a thin film transistor formed over the insulating surface is provided between the second terminal and the first terminal so as to be reverse biased in a normal state, and
wherein each of the first thin film transistor and the diode has a semiconductor film formed in the same step.

10. The data processing device according to claim 9, wherein a p-type impurity region and a n-type impurity region included in the PN diode and the PIN diode are formed in a step in which an impurity region of the second thin film transistor is formed and the p-type impurity region and the n-type impurity region are formed in the semiconductor film.

11. The data processing device according to claim 8, wherein the transistor comprises a semiconductor film including an oxide semiconductor.

12. The data processing device according to claim 11, wherein the oxide semiconductor comprises zinc oxide, indium oxide, and gallium oxide.

13. An IC card comprising the data processing device according to claim 8 and a base material supporting the data processing device, wherein the base material has a structure body for supporting and fixing a terminal device when the terminal device is connected in the terminal portion.

* * * * *